March 16, 1943.    J. G. WALLNY    2,314,294
APPARATUS FOR FILTERING AND WASHING SOLID MATTERS
Filed May 5, 1939
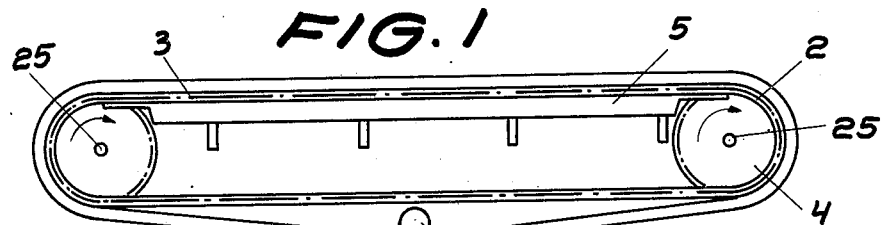
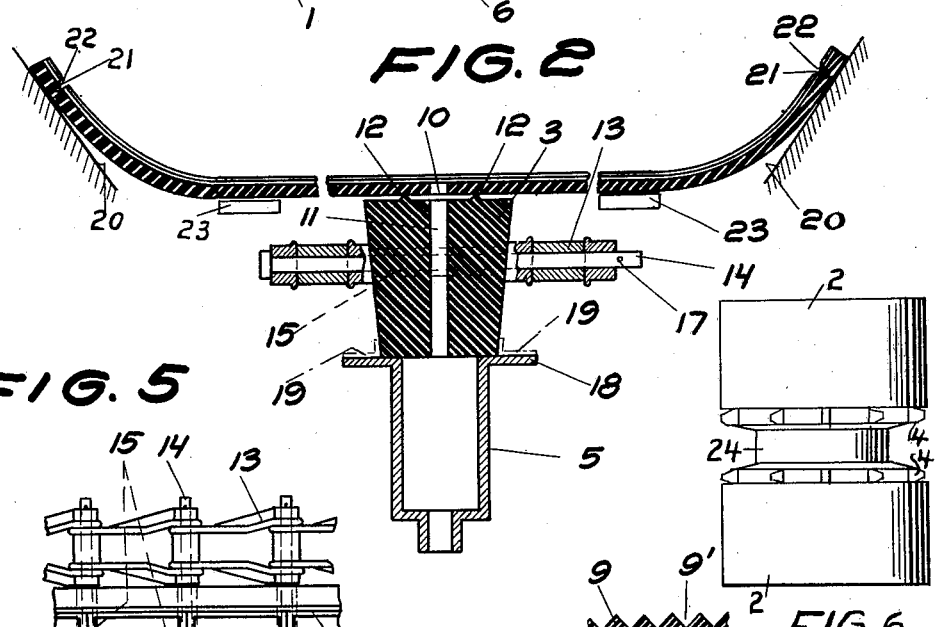
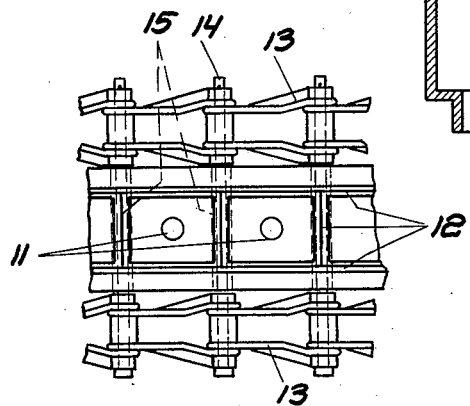
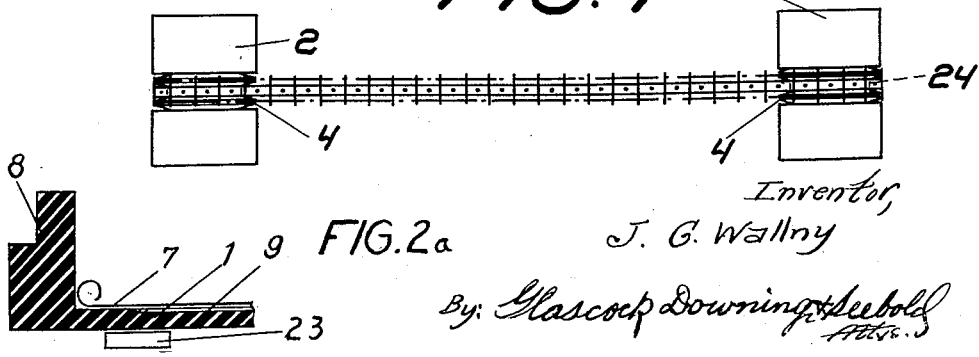
Inventor,
J. G. Wallny
By: Glascock Downing & Seebold
Attys.

Patented Mar. 16, 1943

2,314,294

UNITED STATES PATENT OFFICE 2,314,294

APPARATUS FOR FILTERING AND WASHING SOLID MATTER

John Gunnar Wallny, Landskrona, Sweden

Application May 5, 1939, Serial No. 272,036
In Sweden July 16, 1937

7 Claims. (Cl. 210—197)

The present invention relates to improved apparatus for filtering and washing solid matters of the type generally comprising an endless carrier band supported on two drums, by means of which said band carrying a filter medium is horisontally passed over one or more suction boxes in air tight contact therewith.

The adaptability of the known travelling band filters of the type referred to is substantially restricted due to the excessive stresses and strains encountered in the carrier band during its travelling motion in air tight contact with the suction boxes. These stresses can be divided into stresses due to the friction between the carrier band and the suction boxes and into stresses due to the combined weight of the carrier band, the filter medium and the material to be filtered. Proportionately, the stresses and strains caused by the friction are the greatest, and on account thereof the length of the filter must be kept within certain limits as otherwise the strength of the carrier band will be insufficient to meet these stresses and besides, the carrier band will have a tendency to slide on the drums unless the diameter of these drums is made relatively great.

In the known filters the carrier band consists of an endless elastic rubber band of limited strength and with approximately the same width as the whole filter, and on top of this carrier band is an intermediate perforated or porous band carrying on its top surface a filter cloth serving as a filter medium. The clear liquid passing through the filter cloth collects on the carrier band forming the whole bottom of the filter and is drawn off therefrom into the suction boxes through apertures in the carrier band just opposite a corresponding opening or slot in the suction boxes through which the separated liquid is withdrawn.

Therefore, it is obvious that a travelling band filter of this type only can be built with a comparatively small filtration area, since the length as well as the width of the carrier band must be substantially restricted due to its limit strength properties.

The chief objects of the present invention are to eliminate the aforementioned drawbacks in filtration apparatus of the type recited and to improve the construction of these filters so as to make them more readily adapted for a general use in filtration and washing operations.

According to the invention there is substituted for the aforementioned carrier band of rubber specially designed means adapted to take up all the stresses and strains caused by the frictional resistance due to the motion under air tight contact with the suction boxes, and means adapted to carry the filter medium with the material to be filtered thereon and to collect the filtrate passing through said medium, the first mentioned means also being arranged in air tight contact with the last mentioned means, and both means being provided with apertures providing a passage for the filtrate to the suction boxes.

Also according to the invention the means for taking up the frictional resistance consists of an endless reinforced rubber belt or the like supported on grooved rotatable end pulleys adapted to impart to this belt a travelling motion having the same rate of speed as said means carrying the filter medium.

According to another feature of the invention a number of spaced parallel belts are supported on related end pulleys and passed in air tight contact with associated suction boxes arranged side by side.

It is also a feature of the invention to associate said means for taking up the frictional resistance with tractive means having an almost unlimited tensile strength, such as steel chains, link chains or equivalent means, ropes, cables or the like, of metal, hemp, reinforced rubber or a similar material, said tractive means being operatively connected to the belts or the like and supported on chain wheels or other appropriate rotatable means carried by the same shafts as the end drums.

According to a still further feature of the invention said means carrying the filter medium consists of a rubber band having its top surface formed with grooves and ribs adapted to distribute and maintain a vacuum under the filter medium and to collect the filtrate passing through the filter medium which is supported on the ribs separating said grooves.

The nature, characteristic features and scope of the invention will more readily be understood from the following description and claims taken in connection with the accompanying drawing wherein:

Fig. 1 is a diagrammatical elevational view of a filtering apparatus embodying the invention.

Fig. 2 is a vertical cross sectional view of the upper part of the endless filter with the means adapted to take up the stresses caused by the frictional resistance due to the motion under air tight contact with the suction boxes.

Fig. 2a is a sectional view of a modified filter band.

Fig. 3 is a fragmentary longitudinal sectional view of the endless means carrying the filter medium taken on the centerline of Fig. 2.

Fig. 4 is a diagrammatic plan view of the means adapted to take up the stresses caused by the friction, and of rotatable means adapted to impart a travelling motion to the first mentioned means.

Fig. 5 is a fragmentary detailed plan view of said first mentioned means on an enlarged scale.

Fig. 6 is a plan view of the arrangement at one end of the apparatus for supporting and moving the various parts thereof.

Referring now more particularly to the drawing, wherein like numerals of reference designate similar parts in each of the figures, the numeral 1 designates an endless filter band preferably of reinforced rubber, or another suitable material, supported on rotatable end drums 2. This filter band constitutes the whole bottom of the filter and its top surface is formed with transverse grooves 9' for collecting the liquid filtered through the filter cloth 7 which is supported on the edges of the ribs 9 separating the transverse grooves. Besides providing a support for the filter cloth, the ribs are also arranged for the purpose of evenly distributing the vacuum under the filter cloth and for preventing vacuum losses in the lengthwise direction of the filter. Due to the vacuum set up in the suction boxes 5 the filtrate collected in the grooves is drained off through apertures 10 substantially positioned on the centerline of the filter band.

In Fig. 2a there is shown one arrangement of the side portions of the filter band, wherein the filter band is provided with integral upwardly extending side flange 8 adapted to retain a substantial amount of the material on the filter. In order to prevent vacuum losses at the sides of the filter band, the top surface thereof adjacent the flange 8 is flat and on a level with or somewhat above the edges of the ribs 9. This arrangement of the side portions of the filter band permits the filter cloth to be freely and loosely supported on the filter band with the side edges of the filter cloth preferably turned inwardly. According to the embodiment shown in Fig. 2 there are provided inclined guide surfaces 20 so as to cause the band 1 to take a trough-like form as it passes over the suction box or boxes. When using a filter band with such side portions it is preferred to secure the filter cloth to the filter band, and on account thereof grooves 21, in which the cloth 7 is held by blocks or wedges 22, are provided in the filter band near its side edges. Preferably, there are provided rollers, guide bars or the like 23, as shown in Fig. 2, to assist in supporting the filter band 1 with its load on means as hereinafter described and arranged intermediate the filter band and the suction boxes.

In Fig. 2 said means is shown as an endless belt 3 preferably of reinforced rubber having several layers of an interposed textile material and provided with vertical apertures or channels 11 providing a passage to the suction box 5 for the filtrate to be drained from the grooved and ribbed filter band through its apertures 10. As clearly disclosed in Figs. 2 and 5 there are provided on the top surface of the belt 3 longitudinal and transverse ribs 12, preferably of soft rubber, affording an air tight contact between said belt and the overlying filter band 1 as soon as a vacuum is produced in the suction boxes 5, and simultaneously the smooth bottom surface of the belt 3, sliding on flanges 18 extending laterally from the openings or slots of the suction boxes, makes an air tight contact with said flanges, thus preventing the occurrence of vacuum losses during the operation of the filter. The belt 3 may be air tight secured to the under side surface of the filter band adjacent the apertures therein, as by vulcanizing. For guiding the belt 3 during its sliding movement on the flanges 18 and to assist in preventing vacuum losses angle pieces 19 are secured on the flanges 18, the upwardly extending legs of which are positioned so as to contact the sides of the belt 3. In case the belt 3 is not secured to the under side of the filter band, there may preferably be a roller 6 arranged below the suction boxes for separating the filter band 1 and the belt 3 and thereby facilitating these parts to be washed and cleaned during their return travel.

The endless belt 3 is supported on grooved rotatable end pulleys 24 or the like adapted to impart a travelling motion to the belt and preferably carried by the same shafts 25 as the end drums 2, the diameter of said pulleys being proportionated so as to permit the end drums 2 to support the filter band 1 and to cause this band to travel with the same speed as the belt 3.

It should, however, be understood that a belt or rope having a somewhat different configuration as to the cross sectional area may be substituted for the belt 3 just described and, instead of a single belt there may be a number of spaced parallel belts supported on related end pulleys and passed in air tight contact with associated suction boxes arranged side by side. This construction may be preferred in cases necessitating a filter having a substantial width.

Preferably, the belts 3 or their equivalents are associated with tractive means 13 having an almost unlimited tensile strength, such as steel chains, link chains or equivalent means. The tractive means is operatively connected to one or both sides of the belt 3 or the like and supported on chain wheels 4 or other appropriate rotatable means adapted to impart a travelling motion to the tractive means and preferably carried by the same shafts 25 as the end drums 2 and pulleys 24. In Figs. 2 and 5 said tractive means consists of a pair of steel chains 13 with the belt 3 secured therebetween by means of bolts 14 and pins 17, and preferably the bolts are surrounded by sleeves 16 of metal, hard rubber, ebonite or the like intersecting the belt 3.

While the invention has been described above with reference to specific preferred embodiments, it may have other embodiments within the spirit of the invention which is not therefore restricted to the forms described.

What I claim and desire to secure by Letters Patent is:

1. In filtering apparatus, an endless band, spaced drums rotatably supporting said band, a sheet-like filter arranged over said band, a suction box under said band, a belt arranged intermediate said band and said suction box, said belt being of substantially less width than said band and having a flat surface for air-tight engagement with the top of said suction box, means for sealing the top of said belt with respect to the under surface of said band, said belt having passages therein adapted to communicate with the suction box, said band having a plurality of apertures therein aligned with the passages in said belt, and rotatable means supporting and moving the belt over said suction box at a rate corresponding to the speed of the band.

2. In apparatus of the character described the combination of, a horizontally travelling endless flexible apertured conveyer band of relatively great width, a non-metallic filter web supported on the upper surface of said conveyer band, means providing draining passages between said filter web and said conveyer band to the apertures therein, a stationary suction box, an endless flexible traction belt of relatively small width travelling with and supporting said band and being in contact with said suction box, the apertures in said band being located only in the portion thereof overlying said belt, and said traction belt being apertured for providing communication between the apertures in said conveyer band and said suction box and means for moving said band and belt.

3. In apparatus of the character described the combination of, a horizontally travelling endless flexible apertured conveyer band of elastic material and of relatively great width, a non-metallic filter web supported on the top surface of said conveyer band, means for providing draining passages between said filter web and said conveyer band to the apertures therein, a suction box, an endless flexible traction belt of elastic material and of relatively small width travelling with and supporting said band and being in contact with said suction box and being apertured for providing communication between the apertures in said conveyer band and said suction box, the apertures in said band being located only in the portion thereof overlying said belt, endless flexible traction means connected to said traction belt at spaced intervals therealong, and means for moving said belt, band and traction means.

4. In apparatus of the character described the combination of, a horizontally travelling endless flexible apertured conveyer band of relatively great width, rollers for supporting said conveyer band, a filter web supported on the top face of said conveyer band, means providing draining passages between said filter web and said conveyer band to the apertures therein, a suction box of appreciable length extending between said rollers, an endless flexible reinforced traction belt of elastic material and of relatively small width travelling with and supporting said band and being in contact with said suction box and being apertured for providing communication between the apertures in said conveyer band and said suction box, the apertures in said band being located only in the portion thereof overlying said belt and pulleys for supporting and driving said travelling traction belt and said band.

5. In apparatus of the character described the combination of, a horizontally travelling endless flexible apertured conveyer band of elastic material and of relatively great width, rollers for supporting said conveyer band, a non-metallic filter web supported on the upper surface of said conveyer band, means providing draining passages between said filter web and said conveyer band to the apertures therein, a suction box, an endless flexible belt of elastic material and of relatively small width, pulleys supporting and moving said belt in sliding contact with said suction box and in non-sliding contact with the lower face of said conveyer band, said belt being apertured for providing communication between the apertures in said conveyer band and said suction box, the apertures in said band being located only in the portion thereof overlying said belt and said pulleys being coaxial with the rollers for supporting said conveyer band.

6. In apparatus of the character described the combination of, a horizontally travelling endless flexible apertured conveyer band of elastic material and of relatively great width, rollers for supporting said conveyer band, a filter web supported on the top face of said conveyer band, means providing draining passages between said filter web and said conveyer band to the apertures therein, a suction box, an endless flexible belt of elastic material and relatively small width, pulleys supporting and moving said belt in sliding contact with said suction box and in non-sliding contact with the bottom fact of said conveyer band, said belt being apertured for providing communication between the apertures in said conveyer band and said suction box, endless chains connected to said belt at each side thereof, and sprocket wheels coaxial with said pulleys for supporting and driving said chains.

7. In filtering apparatus, an endless conveyor of relatively great width, spaced rotatable drums supporting and moving said conveyor, suction boxes of relatively small width extending between said drums so that the conveyor moves longitudinally of the suction boxes, said endless conveyor comprising a flexible band having apertures therein including a filter web arranged over said band and means integral with the band forming passages communicating said apertures with substantially the entire under surface of said filter web, an endless traction belt of a width equal to substantially the width of said suction boxes, pulleys supporting and moving said traction belt between and in contact with said suction boxes and in contact with the bottom face of said band and at substantially the same speed as that of said conveyor, and said belt having apertures therethrough providing passages from said suction boxes to the apertures in said band.

JOHN GUNNAR WALLNY.